L. H. BAEKELAND.
SOUND RECORD.
APPLICATION FILED JUNE 11, 1910.
1,083,264.
Patented Dec. 30, 1913.
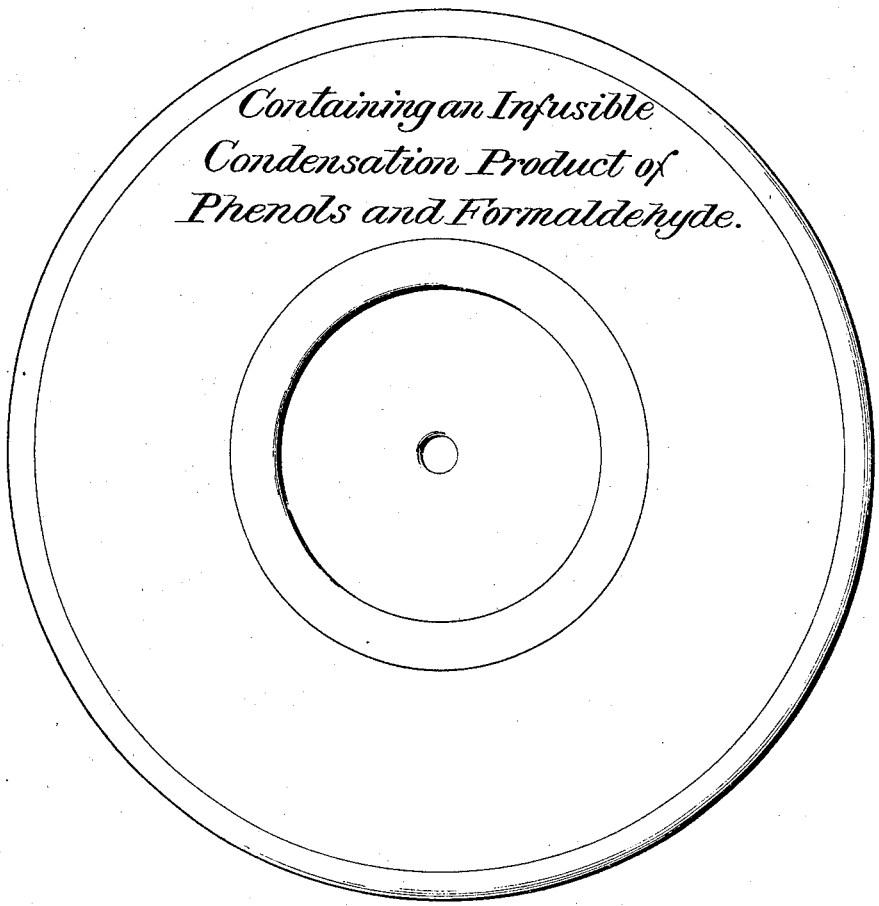
WITNESSES
CMWalker.
C. H. Potter.
Leo H. Baekeland
INVENTOR
by Byrnes, Townsend & Brickenstein
Attorneys

UNITED STATES PATENT OFFICE.

LEO H. BAEKELAND, OF YONKERS, NEW YORK, ASSIGNOR TO GENERAL BAKELITE COMPANY, OF NEW YORK, N. Y., A CORPORATION OF NEW YORK.

SOUND-RECORD.

1,083,264.      Specification of Letters Patent.      Patented Dec. 30, 1913.

Application filed June 11, 1910. Serial No. 566,434.

*To all whom it may concern:*

Be it known that I, LEO H. BAEKELAND, a citizen of the United States, residing at Yonkers, in the county of Westchester and State of New York, have invented certain new and useful Improvements in Sound-Records, of which the following is a specification.

Heretofore, sound records or talking machine records for phonographs, gramophones, and like devices have been molded from suitable matrices, by using suitable materials which melt or soften under the action of heat and harden again under the effects of cooling; for instance, such materials as shellac, or other resins, hard rubber, or celluloid have been utilized for this purpose, either alone or mixed with suitable fillers. There have also been suggested for use certain resinous condensation products of phenols and formaldehyde, which are fusible and thermoplastic.

My invention comprises a sound record containing the hard, infusible or non-thermoplastic condensation products of suitable phenolic bodies and formaldehyde. As these products are infusible, the molding thereof must necessarily be performed at some earlier stage of the chemical reactions which engender them. Several intermediate stages of the chemical process are however known, the products of which are still fusible or plastic, but it is characteristic of such products, insofar as they are adapted for use in accordance with my invention, that through further action of heat, or heat and pressure, or by the use of suitable so-called condensing agents, or catalyzers, they can be transformed by a process of polymerization into the final hard, infusible or non-thermoplastic product.

The various materials heretofore employed for the preparation of sound records have been thermoplastic, melting under the action of heat and hardening again on cooling. In contradistinction to these the final condensation products of phenols and formaldehyde adapted for use in accordance with this invention are non-thermoplastic, being quite incapable in their pure state, or when unmixed with softening agents of softening by heat to such degree as to permit a new perfect impression to be made. In their final condition these possess a remarkable degree of physical and chemical inertness, and are able to withstand the most extreme conditions of weather, being entirely unaffected even by prolonged immersion in water at the boiling point. For this reason such products yield a sound record which is practically permanent and but little liable to accidental injury. The final condensation product is moreover harder than shellac, celluloid or hard rubber, and for this reason withstands much better the wear of the reproducing needle or style, and gives a clearer reproduction. Heretofore also it has been necessary, in order to increase the hardness of the plastic components of the records, to incorporate therewith baryta, silica, metallic oxids and similar inert materials. In the present case however such additions are not essential, although they are preferably used. The sound record properly prepared from the condensation products of phenols and formaldehyde is as smooth as glass and almost as hard, while possessing a much greater degree of strength.

Any of the incomplete or partial condensation products of phenols and formaldehyde which may engender the final hard, infusible product can be used with more or less good results; for instance, so-called phenol-alcohols or their partial anhydrids or derivatives can be used, but I prefer more especially to use such partial condensation products as are obtained by boiling together about equal parts of ordinary carbolic acid and commercial formaldehyde in presence of a suitable amount of ammonia, say about ten per cent. of the total mass, or other suitable condensing agent. This boiling is ordinarily performed in a return condenser, and after some time the mass separates in two layers, the lower one constituting a partial condensation product, which by further application of heat, can be thickened more if desired and can even be transformed into a mass which solidifies on cooling, but which is still fusible or plastic, and which, by further application of heat, can be transformed into the hard infusible condensation product of phenols and formaldehyde.

Instead of ordinary carbolic acid, I can use phenol, or its homologues, or isomers of its homologues, or mixtures thereof, and in this specification and in the claims, the word "phenols" is employed to include the equivalents of the first member of the phenol group. In the same way, instead of using formaldehyde, I can use its polymers or such substances as engender or liberate formaldehyde or are its equivalent, for this purpose.

Although it is possible to make sound records by using the unmixed condensation product, it is preferable to employ the latter in conjunction with suitable filling materials incorporated in the mass; or again, the partial condensation product may be used to impregnate or cover a suitable skeleton or supporting body composed of another suitable substance, as for instance, card board, wood, or metals, etc.

If the material is to be used in mixture with filling materials, for instance baryta, china clay, pigments, fibrous materials, ground wood, etc., the latter are incorporated at any suitable stage of the process before the final molding takes place.

The record can also be prepared by applying on the surface of a suitable support, say a disk or cylinder of any suitable material, a thin layer of partial condensation product, or a mixture thereof containing other suitable substances. This application can be made according to the consistence of the material by brushing, dipping, by dusting on, or by other suitable method; if necessary, proper solvents can be used so as to apply the material in the form of a varnish or paint, or both methods may be used in combination; for example, the surface may be coated with the liquid material, over which sticky surface pulverized material may be applied, either by dusting on, or by any other suitable means. In whatever way the partial condensation product be applied to the support, disk, cylinder, etc., the whole is now submitted to molding and hardening as described above, so as to transform it into the infusible or non-thermoplastic condensation product of greater hardness. Likewise, a disk or cylinder of paper, or cardboard can be impregnated with a partial condensation product in liquid form, or in solution in appropriate volatile solvents, as for example acetone, alcohol, etc., and then molded and hardened as described before.

One of the most practical ways of applying my invention consists in making a dry or wet paper mass containing a suitable amount of partial condensation product, the latter preferably in solid form but in comminuted condition, and to form this paper mass in a provisional shape easily adapted to further operations, for instance, disks or cylinders, which then can be pressed and molded hot or otherwise hardened in a suitable matrix. A method of this character is claimed in my copending application Ser. No. 520,676, filed October 2, 1909.

The temperature employed in molding is in excess of that required for merely softening the mass, and is sufficient to induce a transformation of the partial condensation product into the final condensation product under the best operating conditions. For this purpose it is preferred to employ temperatures considerably in excess of 100° C., and at times exceeding 200° C. The molded object may be cooled before it is separated from the mold for the purpose of facilitating handling; cooling is not however required for hardening the article, which is hard even though delivered hot from the mold.

The paper mass can be made in a "beater" or grinder, or other suitable device, as used ordinarily for paper or pulp-making, and other suitable substances or fillers may be used, or pigments or dyes may be added, to improve the chemical or physical properties or appearance of the final article.

Instead of making these disks or cylinders of homogeneous composition, it is advisable to build them up in such a way that the so-called "talking" surface, or record side, may consist of a layer richer in condensation product than the substance of the substratum and comprising either the substantially pure condensation product or a comparatively rich mixture thereof with fibrous or other filling materials. This produces a harder and more resisting surface and decreases also the cost of the material. It may become necessary to provide a surface coating of this kind on both sides, even in cases where the record is formed on one side only, so as to compensate irregular contraction and to avoid warping.

The application of a richer surface layer can be accomplished in the way described above, or the condensation product may simply be applied on the matrix by dusting on or otherwise before the molding takes place.

In the specification, I designate as "partial condensation products" any material resulting from the direct or indirect condensation of phenols and formaldehyde, or equivalent chemical substances, which by the application of heat or condensing agents, can be transformed into infusible condensation products, as distinguished from such fusible soluble condensation products of phenols and formaldehyde as are incapable of transformation by the action of heat into infusible bodies and which therefore are much less adapted for this purpose, being less strong, less hard, and remaining fusible. The term "sound record" is herein used to designate all forms of records, whether musical or otherwise, for the reproduction of sound in devices of the general character above mentioned.

Reference is made to the accompanying drawing showing a conventional type of sound record, having indicated thereon the character of the composition.

The term "non-thermoplastic," as applied to the completed sound record, indicates that the material, in contradistinction to shellac, resinous condensation products, and analogous materials, is incapable of fusion at any temperature, and does not soften to an appreciable degree under the highest temperatures to which it may be exposed under conditions of use.

I claim:

1. As a new article of manufacture, a non-thermoplastic sound record embodying an infusible condensation product of phenols and formaldehyde.

2. As a new article of manufacture, a non-thermoplastic sound record, embodying an infusible condensation product of phenols and formaldehyde, in conjunction with a suitable filling material.

3. As a new article of manufacture, a non-thermoplastic sound record, embodying an infusible condensation product of phenols and formaldehyde, in conjunction with a fibrous filling material.

4. As a new article of manufacture, a non-thermoplastic sound record of which the record surface is principally composed of infusible condensation products of phenols and formaldehyde.

5. As a new article of manufacture, a non-thermoplastic sound record of which the record surface is principally composed of infusible condensation products of phenols and formaldehyde, in conjunction with suitable filling materials.

6. As a new article of manufacture, a non-thermoplastic sound record of which the record surface is principally composed of infusible condensation products of phenols and formaldehyde, in conjunction with fibrous materials.

In testimony whereof, I affix my signature in presence of two witnesses.

LEO H. BAEKELAND.

Witnesses:
AUGUST GOTTLIELF,
LEWIS F. TAYLOR.